C. W. PRICE.
SHOCK ABSORBER.
APPLICATION FILED APR. 21, 1914.
1,141,264.
Patented June 1, 1915.
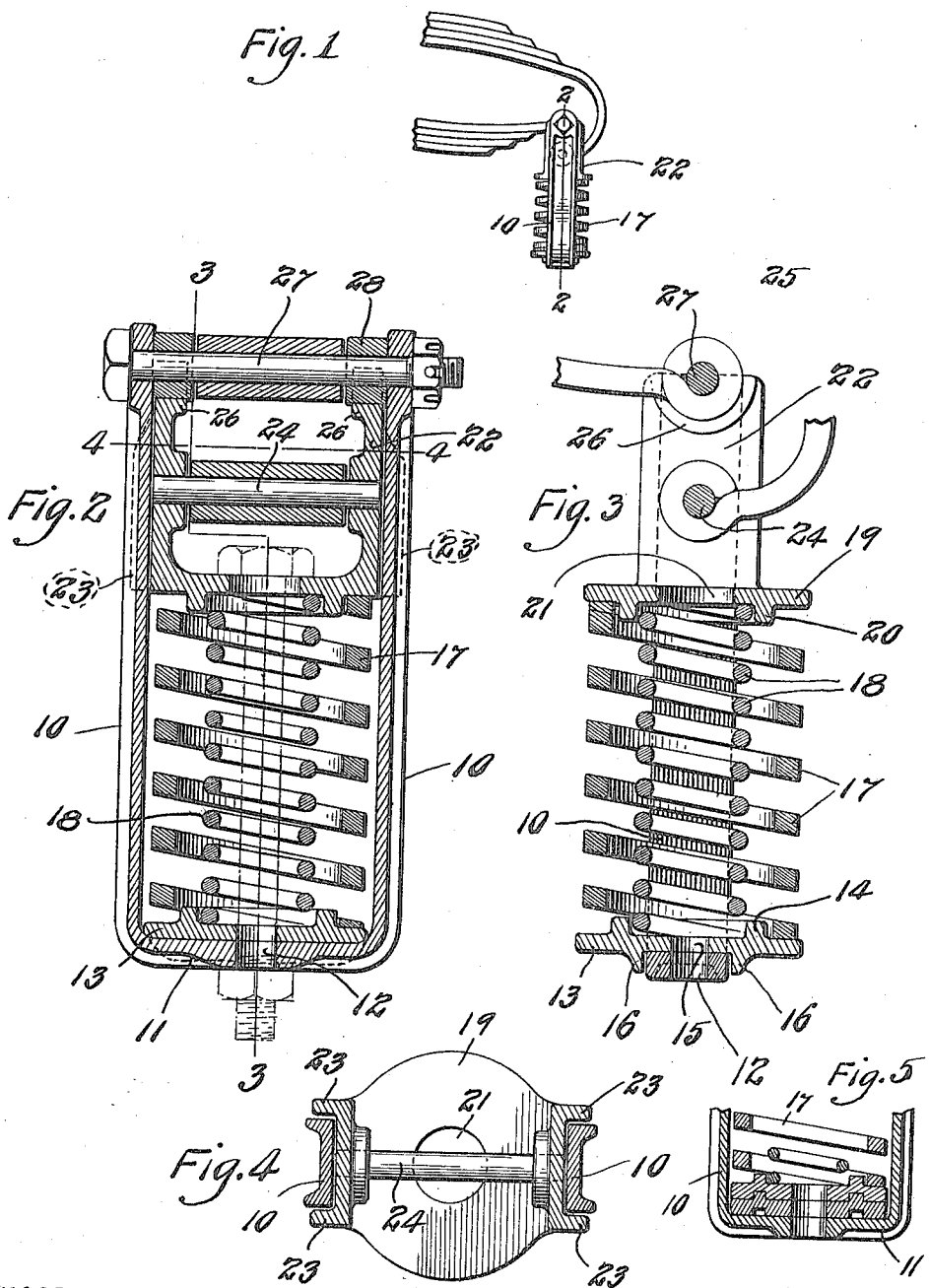
Witnesses
Wm. James
W. O. Smith
Inventor,
Charles W. Price,
By J. W. [Attorney], Atty.

UNITED STATES PATENT OFFICE.

CHARLES W. PRICE, OF ST. LOUIS, MISSOURI.

SHOCK-ABSORBER.

1,141,264.

Specification of Letters Patent. Patented June 1, 1915.

Application filed April 21, 1914. Serial No. 833,435.

*To all whom it may concern:*

Be it known that I, CHARLES W. PRICE, a citizen of the United States, residing at St. Louis, Missouri, have invented a certain new and useful Improvement in Shock-Absorbers, of which the following is a full, clear, and exact description, such as will enable others skilled in the art to which it appertains to make and use the same, reference being had to the accompanying drawings, forming part of this specification, in which—

Figure 1 is a side elevational view of a shock absorber of my improved construction. Fig. 2 is an enlarged vertical section taken approximately on the line 2—2 of Fig. 1. Fig. 3 is a vertical section taken on the line 3—3 of Fig. 2. Fig. 4 is a horizontal section taken approximately on the line 4—4 of Fig. 2. Fig. 5 is a section taken through the lower end of the yoke forming a part of my improved device, and showing a modified arrangement of the lower spring seat.

My invention relates generally to a supplementary spring or shock absorber particularly intended for use in connection with the elliptic side springs of vehicles, and particularly those which are motor driven.

The principal object of my invention is to provide a comparatively simple and inexpensive shock absorber which will be readily responsive to all service shocks and stresses, and which comprises a minimum number of parts arranged and combined in such a manner as to afford the greatest structural strength, and at the same time, facilitating assemblage and the removal or replacement of parts which may become worn or unfit for service.

A further object of my invention is to provide, in a device of the character indicated, a one piece member, preferably a casting which serves as a seat for the upper ends of the spiral springs forming a part of the device, guides for said plate or spring seat, a point of attachment for one of the elliptic springs with which the device is associated, and stops to limit the upward movement of the spiral springs.

With the foregoing and other objects in view, my invention consists in certain novel features of construction and arrangement of parts, hereinafter more fully described and claimed.

In the construction of my improved device, I provide a yoke which is substantially U-shape and comprising a pair of parallel legs 10 which are united at their lower ends by a horizontally disposed member 11. The central portion of this member 11 is preferably reinforced by being made thicker than its end portions, and formed through said reinforced central portion is an aperture 12.

Removably seated on the member 11 is a plate 13 which performs the function of a seat for the lower ends of the spiral springs forming a part of the device, and formed integral with the top of this plate is an annular bead or flange 14 which occupies a position within the lower coil of the larger spring and incloses the lower coil of the smaller spring, thus holding the lower portions of both springs in proper position.

Formed through the center of plate 13 is an aperture 15 which coincides with the aperture 12. Formed on the underside of plate 13 are depending parallel ribs 16 which occupy positions to the sides of the transverse member 11, thus maintaining said plate in proper position on the lower end of the yoke. Positioned on the plate 13 is a comparatively heavy outer spiral spring 17 and a comparatively light inner spring 18. Positioned on the upper ends of these springs and between the legs 10 of the yoke is a plate 19 preferably in the form of a disk, and formed integral therewith on its underside is an annular bead or flange 20, which occupies a position within the upper end of spring 17 and incloses the upper end of spring 18, thus holding said springs in proper operative position.

Formed in the center of plate 19 is an aperture 21 adapted to receive a bolt or screw rod, such as is shown by dotted lines in Fig. 1, and which also passes through the apertures 12 and 15 and being utilized for the purpose of producing the initial compression in the springs 17 and 18 while assembling the parts of the device.

Formed integral with plate 19 and at opposite points on the edge thereof is a pair of upwardly projecting legs 22 which normally bear against the inner faces of the upper portions of legs 10, and formed integral with the edges of these legs are outwardly projecting ribs or flanges 23 which serve to guide the legs 22 and plate 19 during their vertical movement with respect to the yoke.

Seated in the central portions of the legs 22 are the ends of a pin or bolt 24 which serves as a point of attachment for the end of one of the vehicle springs. The upper ends of the legs 22 are made substantially U-shape as designated by 25, and said upper edges are reinforced with integral ribs 26, thereby forming seats which receive thimbles or spacing rings hereinafter described, and thus serving as stops to limit the upward movement of the legs 22 and plate 19.

The upper ends of the legs 10 are perforated to receive a transversely disposed pin or bolt 27, the same serving as a point of attachment for the end of one of the vehicle springs. Located on this bolt 27 between the vehicle spring and the upper ends of the legs 10 are spacing rings or thimbles 28 which normally occupy the seats 25 in the upper ends of the legs 22. These thimbles or rings can be varied in length to correspond with the width of the spring which is connected to bolt 27, and thus movement of the spring lengthwise upon said bolt is prevented.

It will be noted that the end of one of the vehicle springs is connected to the member comprising the plate 19 and legs 22, while the end of the other vehicle spring is connected to the bolt which is seated in the upper ends of the legs of the yoke, and by virtue of such construction the movement resulting from shocks to either one of the vehicle springs will be transmitted to, and absorbed by, the coil springs 17 and 18, and during such action the casting comprising the plate 19 and legs 22 will slide downward upon the upper portions of the legs 10 or vice versa, thus compressing the spiral springs and consequently absorbing the shocks and vibrations. By providing the annular ribs 14 and 20 on the spring plates, the ends of said springs are at all times held in proper positions upon their seats, and by providing the ribs 23 on the legs 22, the latter will be guided during their movement relative to the legs 10.

A device of my improved construction is comparatively simple, can be easily assembled or taken apart, is effective in absorbing shocks and vibrations which are ordinarily transmitted from one portion of an elliptic vehicle spring to the other and by reason of its open construction, the device can be easily and quickly cleaned.

In Fig. 5 I have shown a construction which makes it possible to increase or regulate the normal tension of the spiral springs, this construction including two or more disks which are adapted to be placed one on top of the other and arranged between the transverse member at the lower end of the yoke and the lower ends of the spiral springs.

It will be readily understood that minor changes in the size, form and construction of the various parts of my improved shock absorber can be made and substituted for those herein shown and described, without departing from the spirit of my invention, the scope of which is set forth in the appended claim.

I claim:

A shock absorber comprising a one piece V-shaped yoke, a transverse member seated in the upper ends of the legs thereof and serving as a point of attachment for a vehicle spring, spacing thimbles loosely mounted on the ends of said transverse member between the upper ends of the yoke and the vehicle spring, a plate removably positioned on the lower end of the yoke, flanges depending from said plate and engaging the side edges of the transverse member at the lower end of the yoke to prevent lateral displacement of said plate, a spiral spring seated on said plate, a second plate seated on the upper end of the spiral spring, legs on said second plate, which legs bear upon the upper portions of the legs of the yoke, guide ribs formed on the sides of said legs, the upper ends of said legs being notched to form seats for the spacing thimbles, and a transverse member seated in the legs on the plate to form a point of attachment for a vehicle spring, said plates and the lower end of the yoke being provided with alined apertures which are adapted to receive means for imparting initial tension to the spiral spring when the device is assembled.

In testimony whereof I hereunto affix my signature in the presence of two witnesses, this 17th day of April, 1914.

CHARLES W. PRICE.

Witnesses:
M. P. SMITH,
LOUIS F. ABEL.

Copies of this patent may be obtained for five cents each, by addressing the "Commissioner of Patents, Washington, D. C."